United States Patent [19]

Lenz et al.

[11] Patent Number: 5,624,301
[45] Date of Patent: Apr. 29, 1997

[54] METHOD AND MECHANISM FOR THE GRINDING OF GROOVE-SHAPED EXTERNAL PROFILES ON WORK PIECES

[75] Inventors: Sieghart Lenz; Hans-Joachim Ulrich, both of Berlin; Jürgen Rühle, Nassenheide, all of Germany

[73] Assignee: NILES Werkzeugmaschinen GmbH Berlin, Berlin, Germany

[21] Appl. No.: 302,904

[22] PCT Filed: Mar. 12, 1993

[86] PCT No.: PCT/DE93/00244

§ 371 Date: Sep. 20, 1994

§ 102(e) Date: Sep. 20, 1994

[87] PCT Pub. No.: WO93/19881

PCT Pub. Date: Oct. 14, 1993

[30] Foreign Application Priority Data

Mar. 27, 1992 [DE] Germany ............... 42 10 710.5

[51] Int. Cl.⁶ .................................................. B24B 1/00
[52] U.S. Cl. ........................... 451/47; 451/21; 451/219
[58] Field of Search ........................ 451/47, 21, 253, 451/219, 275, 56; 125/11.01, 11.23

[56] References Cited

U.S. PATENT DOCUMENTS

| | | | |
|---|---|---|---|
| 3,776,213 | 12/1973 | Clarke et al. | 125/11.05 |
| 4,393,625 | 7/1983 | Bloch et al. | 451/21 |
| 4,400,916 | 8/1983 | Bloch et al. | 451/21 |

FOREIGN PATENT DOCUMENTS

| | | |
|---|---|---|
| 0021329 | 1/1981 | European Pat. Off. . |
| 0328482 | 8/1989 | European Pat. Off. . |
| 2531653 | 2/1984 | France . |
| 877093 | 5/1953 | Germany . |
| 2343494 | 10/1974 | Germany . |
| 3524690 | 3/1986 | Germany . |
| 0262177 | 11/1988 | Germany . |
| 3736463 | 5/1989 | Germany . |
| 0291500 | 7/1991 | Germany . |

OTHER PUBLICATIONS

Figure 8:
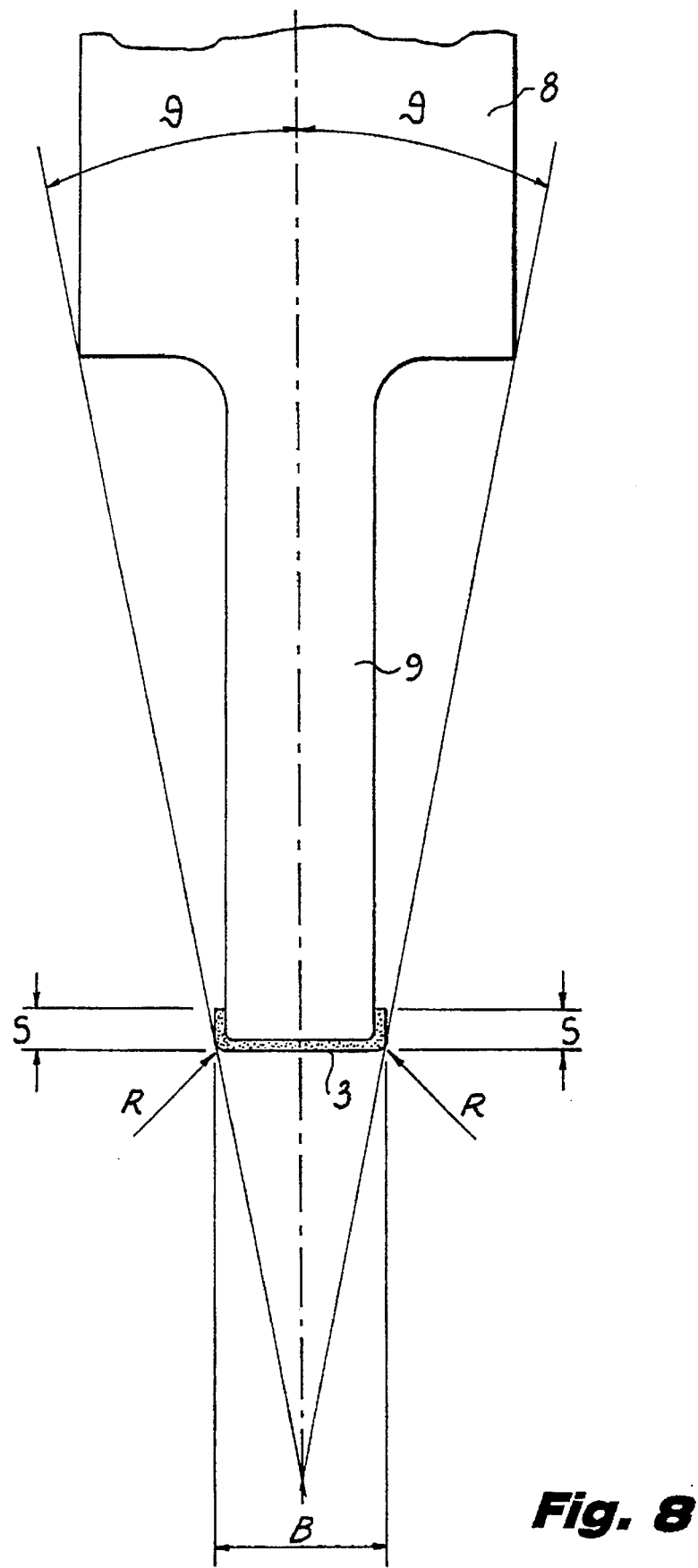

Werkstatt und Betrieb vol. 118, No. 5, May 1985, Munchen (DE) pp. 289–293.
H.H. Hofmann 'Zahnflankenschileifen Mit Life See p. 292, right–hand col., line 12–p. 293, left hand col. line 11: Fig. 8.
Keck "Die Zahnradpraxis" Verlag R. Oldenbourg Munchen(DE)1956 see pp. 195 ff. cited in the application.

*Primary Examiner*—Robert A. Rose
*Attorney, Agent, or Firm*—Nolte, Nolte and Hunter, P.C.

[57] ABSTRACT

The invention covers a method and a mechanism for the simultaneous machining of profile sections of one and the same work piece by two grinding wheels. Acc. to the method first the finish-grinding positions of the two grinding wheels (4.1 and 4.2) are calculated. After moving the two grinding wheels (4.1 and 4.2) into these positions these two grinding wheels (4.1 and 4.2) are profiled by the dressing tool (1) to generate a surface/roughness suitable for rough-grinding. Then the two grinding wheels (4.1 and 4.2) are moved into the calculated rough-grinding positions and then this operation takes place. Then the two grinding wheels (4.1 and 4.2) are moved into the finish-grinding positions followed by dressing to generate the surface/roughness for finish grinding. Acc. to the mechanism the grinding slides (14.1 and 14.2) are arranged in such a way that the two grinding wheels (4.1 and 4.2) have a common axis of rotation (15). The rotating dressing tool (1) located on a dresser (16) to be traversed in two planes is arranged parallel to this axis (15). By means of this dressing tool (1) all profile sections of the two grinding wheels (4.1 and 4.2) can be profiled. The generated profiles are transferred onto the work piece (2) without error.

8 Claims, 10 Drawing Sheets

METHOD AND MECHANISM FOR THE GRINDING OF GROOVE-SHAPED EXTERNAL PROFILES ON WORK PIECES

This invention covers a method and mechanism for the grinding of groove-shaped external profiles on work pieces, particularly for the grinding of the teeth of straight and helical spur gears, i.e., profile sections of one and the same work piece are simultaneously machined by two grinding wheels which are profiled according to the required external profile contours of the work pieces and the metal is removed by opposite feed movement and joint stroking travel of the two grinding wheels.

It is known that with profile grinding the accuracy of the profile generated on the work piece depends principally on the accuracy of the grinding wheel profile. This is due to the fact that the profile of the grinding wheel is directly transferred to the work piece. Each deviation from the desired profile of the grinding wheel results in a real error on the work piece.

Consequently, the grinding wheel has to have the precise negative profile of the profile to be produced in order to obtain a high machined accuracy.

On the other hand, the topography of the grinding wheel is determined by the mode and method used to profile the grinding wheel. The topography, in turn, influences to a large extent the accuracy and efficiency of the grinding operation.

Due to the afore said causes, the process of profiling the grinding wheel is most important with profile grinding.

Various methods and mechanisms are known for the profile grinding of work pieces which also include solutions for the dressing of grinding wheels.

According to Keck "Die Zahnradpraxis" (Published by R. Oldenbourg, Munich, 1956), pages 195 and following, the use of two grinding wheels for the simultaneous machining of opposite tooth flanks of one and the same gear wheel with profile grinding is known. Both grinding wheels are firmly and co-axially mounted on a single grinding spindle, a defined distance apart. Before the grinding process starts the grinding wheels are profiled by a dresser.

This solution has the disadvantage that the two grinding wheels exhibit a low stiffness because of their disc shape. The low stiffness of the grinding wheels and their different inclination caused by the spindle bending lead to reduced machining accuracy. This disadvantage occurs especially when gear wheels featuring a small module are machined. In connection with this solution ways of profile dressing the grinding wheels is described. This description refers to the method by which the profiled grinding wheels are diamond dressed, whose points follow a given path which is controlled by templates. This, in turn, makes it necessary to produce a special template for each profile.

A further disadvantage of this solution is poor flexibility, since the machine can only be changed to other machining tasks by the necessary alteration to the grinding wheel mounts, changing the grinding wheels and resetting the dresser. A process which is both time consuming and costly.

In the DD-AP 291 500 a solution is described which covers the machining of profiled work pieces, particularly gear wheels, by two separately arranged grinding wheels. Each grinding wheel is located on a grinding slide and both grinding slides are inclined by a fixed angle related to the traversing axes of the grinding slides. For the profiling, a separate dressing tool is allocated to each grinding wheel. The grinding wheels are profiled through continuous path control along the machine axes $Y_A/U_1$ and $Y_A/U_2$. The disadvantage of this solution is that the infeed travel of the dressing slide $\Delta Y_A$ requires a compensation for the two grinding wheel axes by $\Delta U_1$ and $\Delta U_2$. In this, both the positioning errors of the dressing tools and the compensatory movement directly effect the machining accuracy.

A further disadvantage is that, in order to guide the machine axes $Y_A/U_1$ and $Y_A/U_2$ along a continuous path, the work piece profile has to be permanently transferred into the software controlling the dressing profile, which increases the cost of the computer required.

The DE-AS 23 43 494 delivers a description of a dresser for a grinding wheel in a gear profile grinding machine.

By an example the dressing of two grinding wheels at a time is explained. To the dressing tool has been imparted the profile of two tooth flanks of the spur gear to be ground. This is a disadvantage in that this dressing tool can be used for these work pieces only. Changing over the machine to another application, requires different dressing tools. This disadvantage becomes particularly apparent with small lot sizes. Furthermore, it is considered to be a further disadvantage that an optimum profile of the grinding wheel cannot be obtained by the dressing tool.

The patent description DE-PS 877 093 presents a machine for the grinding of tooth flanks by means of profiled grinding wheels. This solution means that two grinding wheels designed as profiled discs grind each right and left flank of a gear tooth. Both grinding wheels are arranged, and adjustable on a separate base, each base may be swivelled around the work axis relatively to the work piece to feed the grinding wheels in to cutting depth. Furthermore, this solution necessitates that each grinding wheel has its own dresser. Therefore, both grinding wheels can only be dressed independently of each other. This means that the accuracy of the corresponding grinding wheel profiles required for finishing the gear wheel is restricted by the limitations of the dressing process.

Acc. to DE-OS 37 36 464, a grinding machine and a method performed on this machine are also known. This machine features a working table reciprocating relative to the rotating grinding wheel, which carries a dresser which is aligned to the work piece. Both grinding and dressing are automatically controlled. This grinding machine also enables the generation of a desired profile on the grinding wheel to machine the work pieces which have been pre-profiled accordingly. An additional measuring unit detects deviations of the work piece from the desired dimensions which may be corrected afterwards with further grinding. The disadvantage of this solution is that productivity is limited since only one grinding wheel is used.

The basis of this invention is to create a method and mechanism for the grinding of groove-shaped external profiles on work pieces, particularly for the grinding of teeth of straight and helical spur gears. Two grinding wheels profiled acc. to the outer contours of the work piece required, grind at the same time profile sections of one and the same work piece to produce a large number of different profiles on the work piece with high precision and efficiency as well as giving a fast and easy change to different machining tasks. The grinding wheels are fed to cutting depth by displacing them towards each other and the metal is removed by their combined movement. The method is according to the procedure and characteristics of the patent claim 1.

The feature of the patent claim 2 describes the superior method for the dressing of the grinding wheels for the profile grinding of gear wheels acc. to the relevant invention method in the patent claim 1.

The mechanism to perform the relevant patent method acc. to the patent claim 3 means, acc. to the invention, that two grinding slides are arranged in such a way that both grinding wheels mounted on them have a common axis of rotation. Each grinding slide is CNC-controlled and axially adjustable along this common axis and a single rotating dressing tool is used for both grinding wheels. The axis of rotation of the dressing tool is parallel to the grinding wheels. The dressing tool is mounted on a dressing unit moving in two co-ordinates and is controlled by the CNC-unit. The design of the relevant invention mechanism offers a superior form of the rotating grinding wheel characterised by the patent claim 4.

A further superior shape of the rotating dressing tool is characterised by the patent claim 5.

The main advantage of the relevant invention means that all profile sections of the grinding wheel can be profiled in a closed working cycle by a single dressing tool featuring a defined profile. In this way, a high reproducibility with low expenditure is possible when changing to other profiles.

The identical dressing and finish-grinding positions of the grinding wheels guarantees and provides for a true transfer of the profiles imparted to the grinding wheels onto the work piece. The relevant invention is applicable to profile grinding as well as for the index generation grinding of gear-like parts.

Both one or two single-profile and multi-profile grinding wheels can be used.

Figure 1:
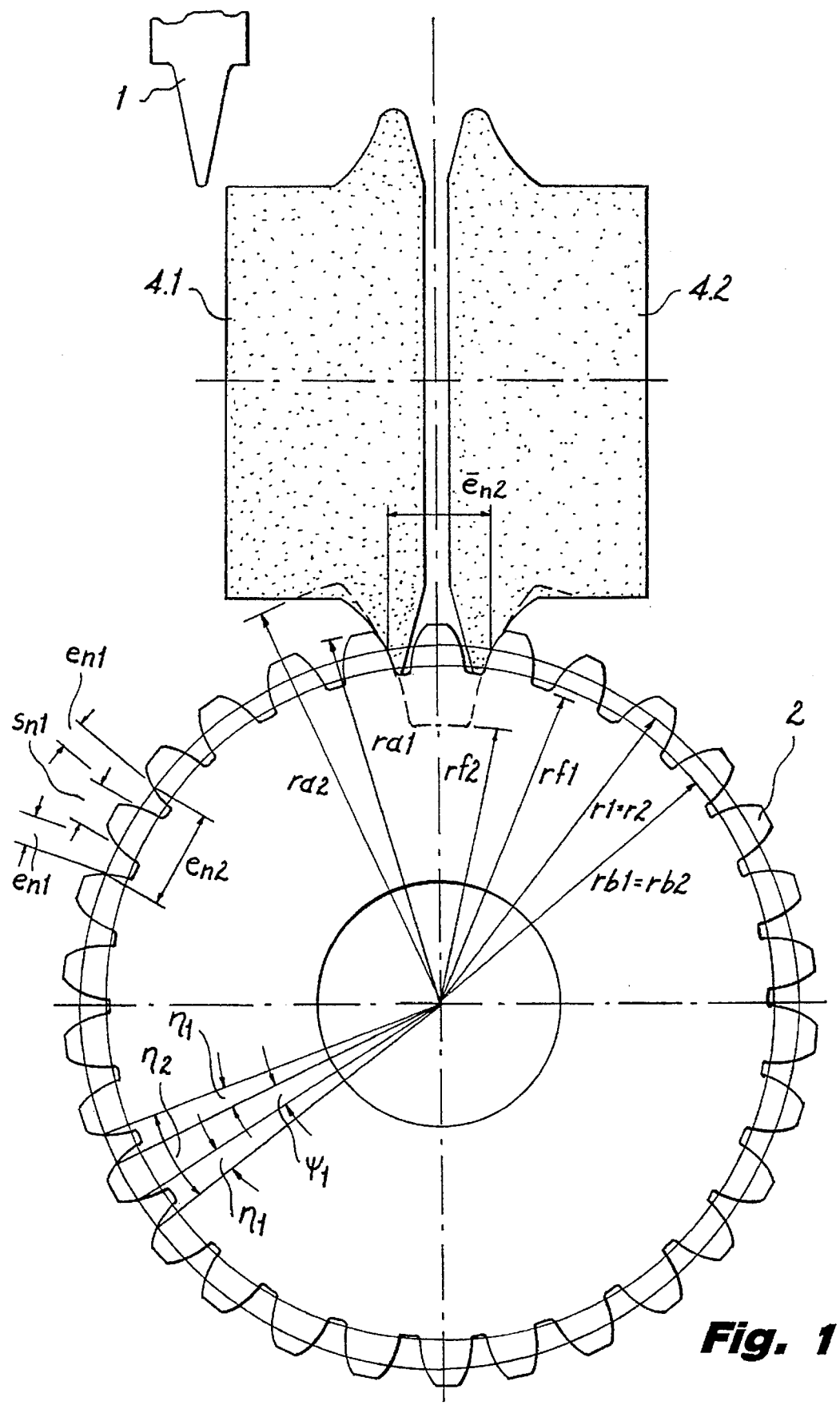
Figure 2:
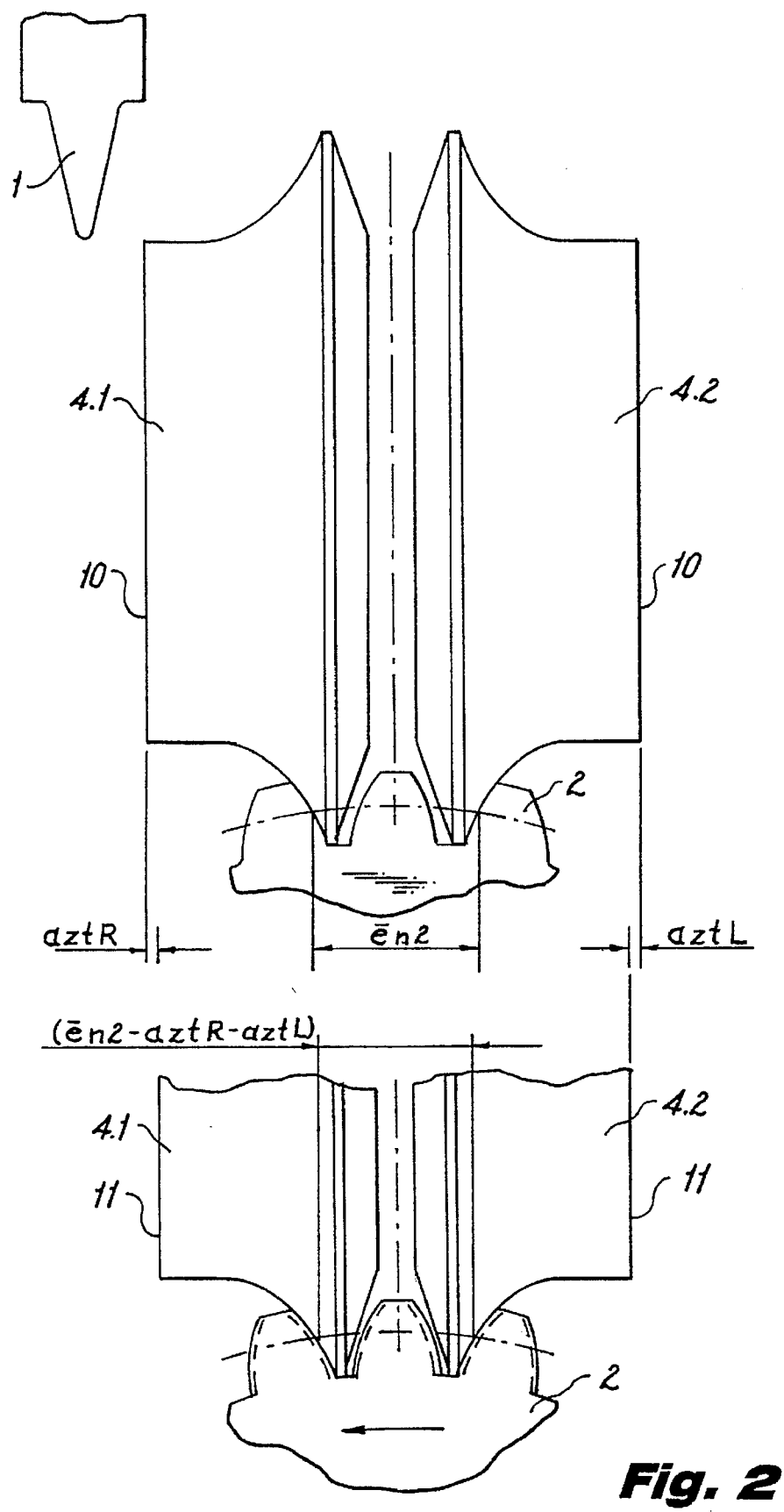
Figure 3B:
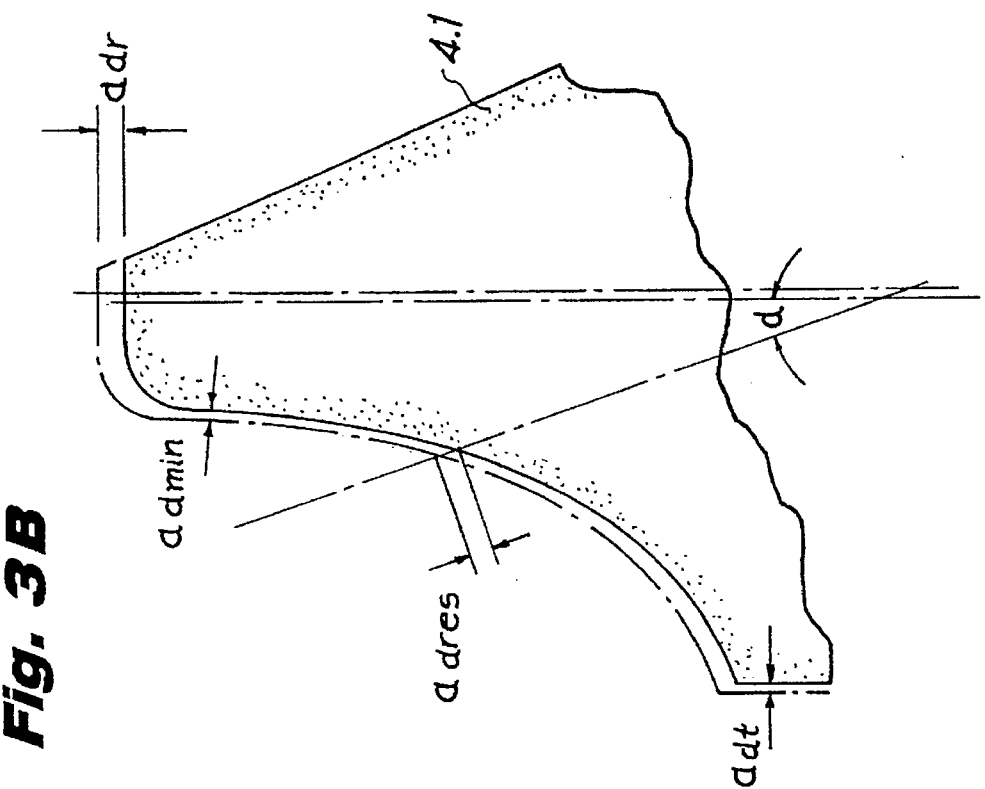
Figure 3A:
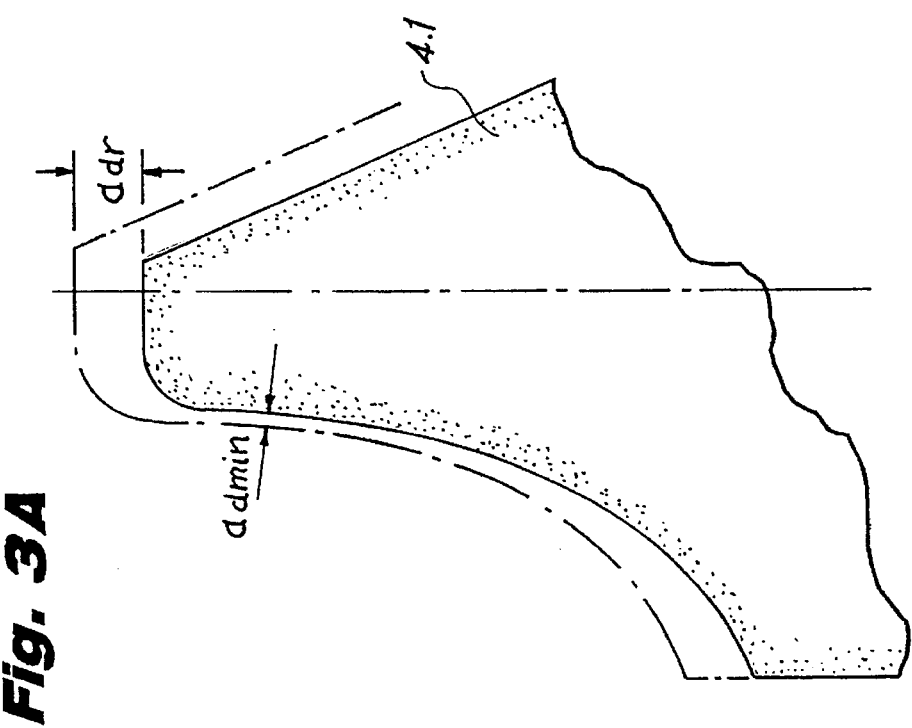
Figure 4:
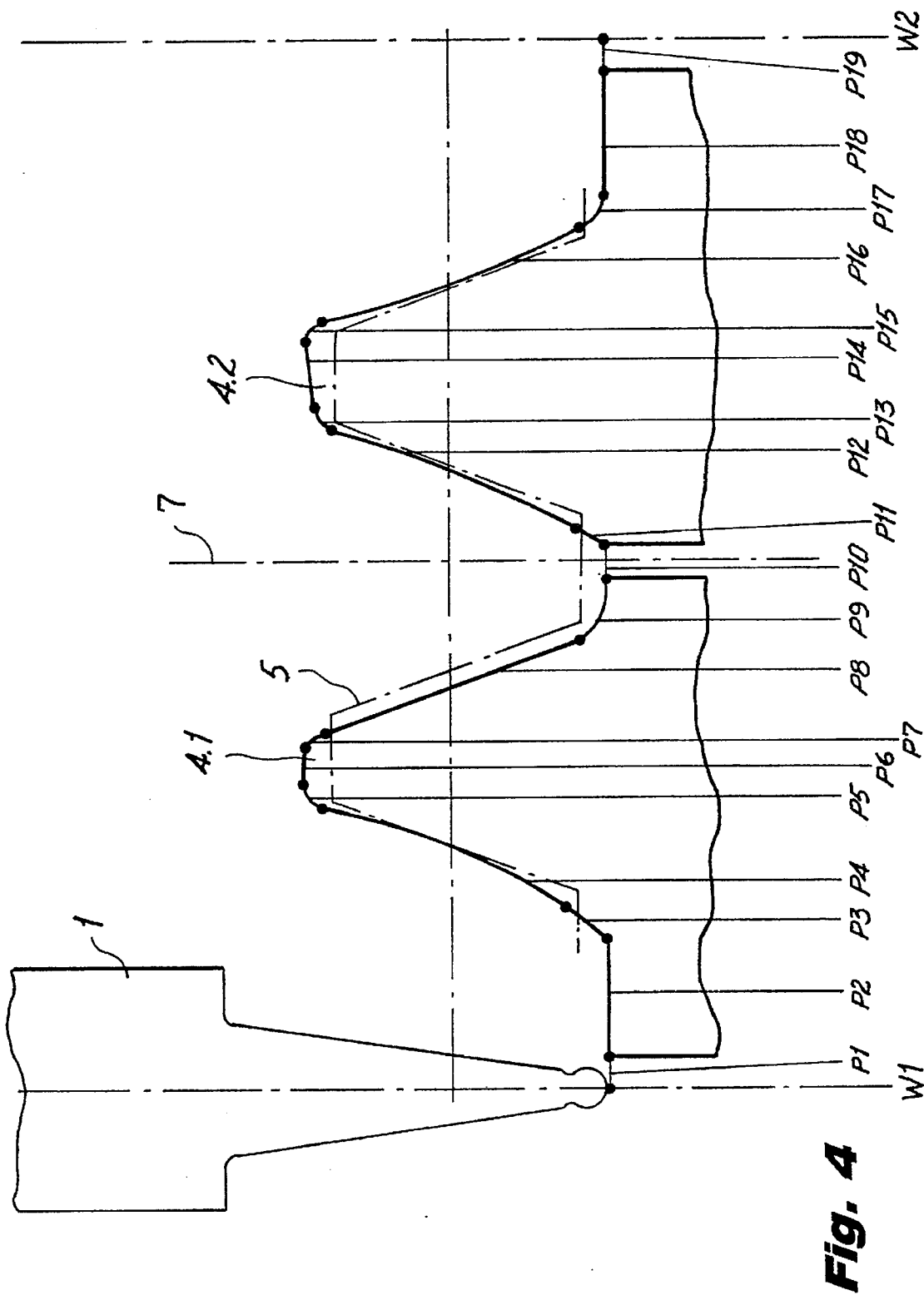
Figure 5B:
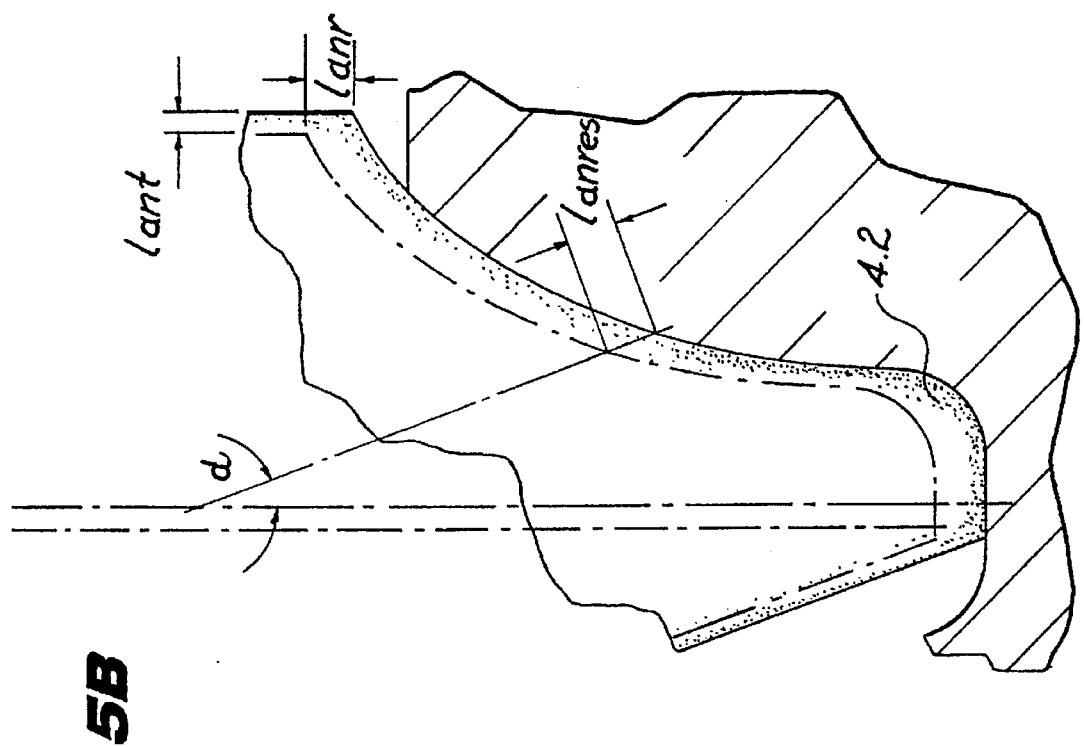
Figure 5A:
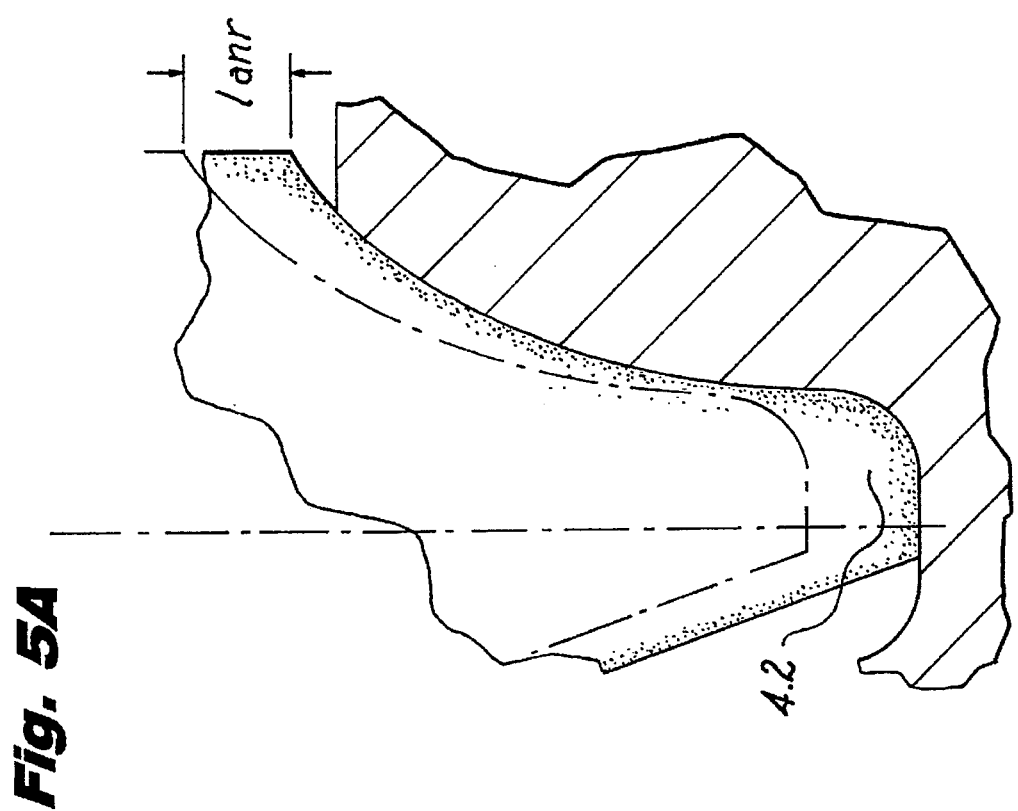
Figure 6:
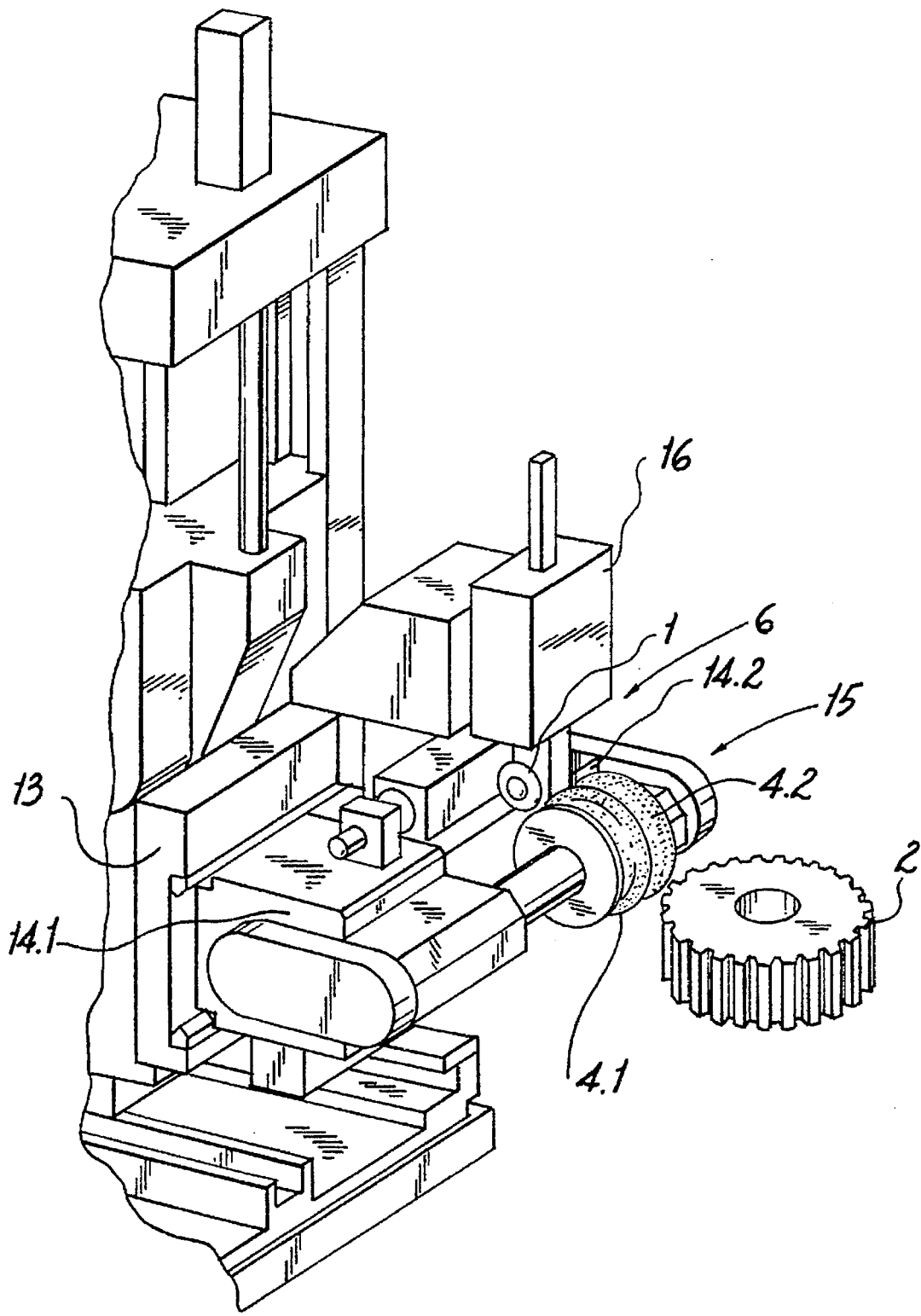
Figure 7:
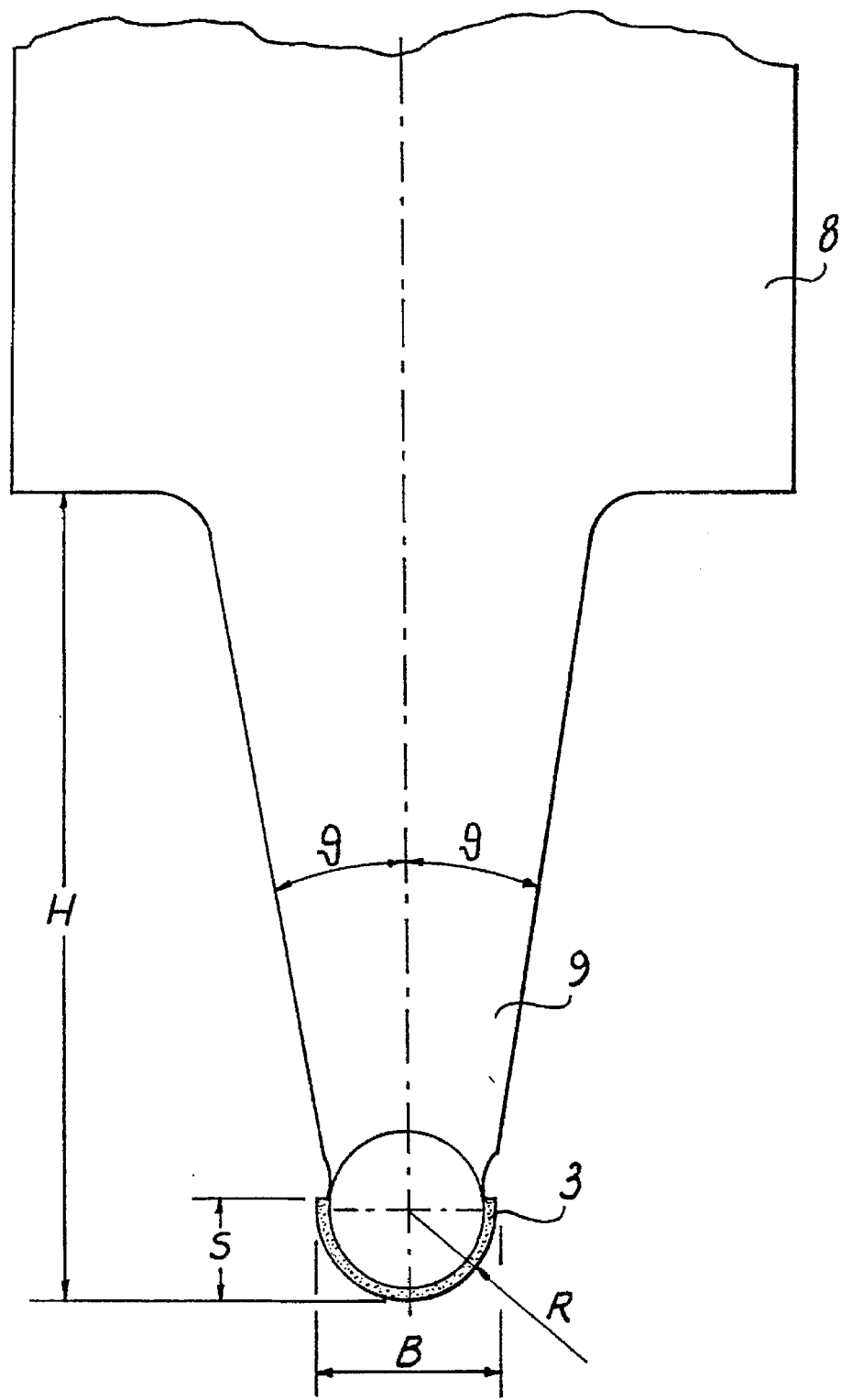
Figure 10:
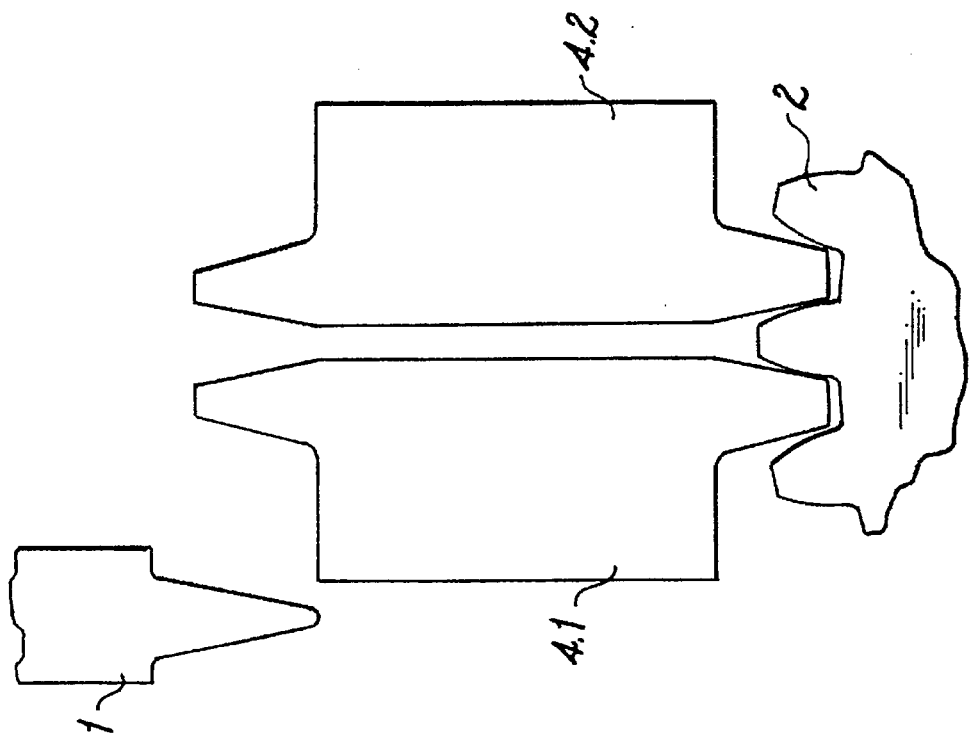
Figure 9:
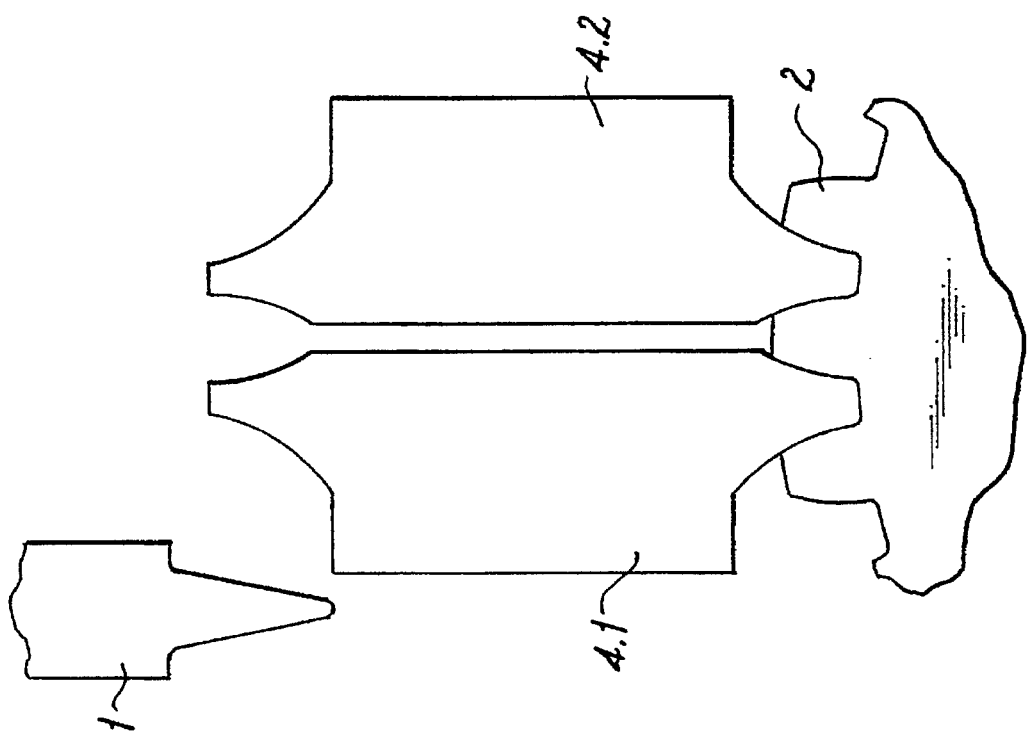
Figure 11:
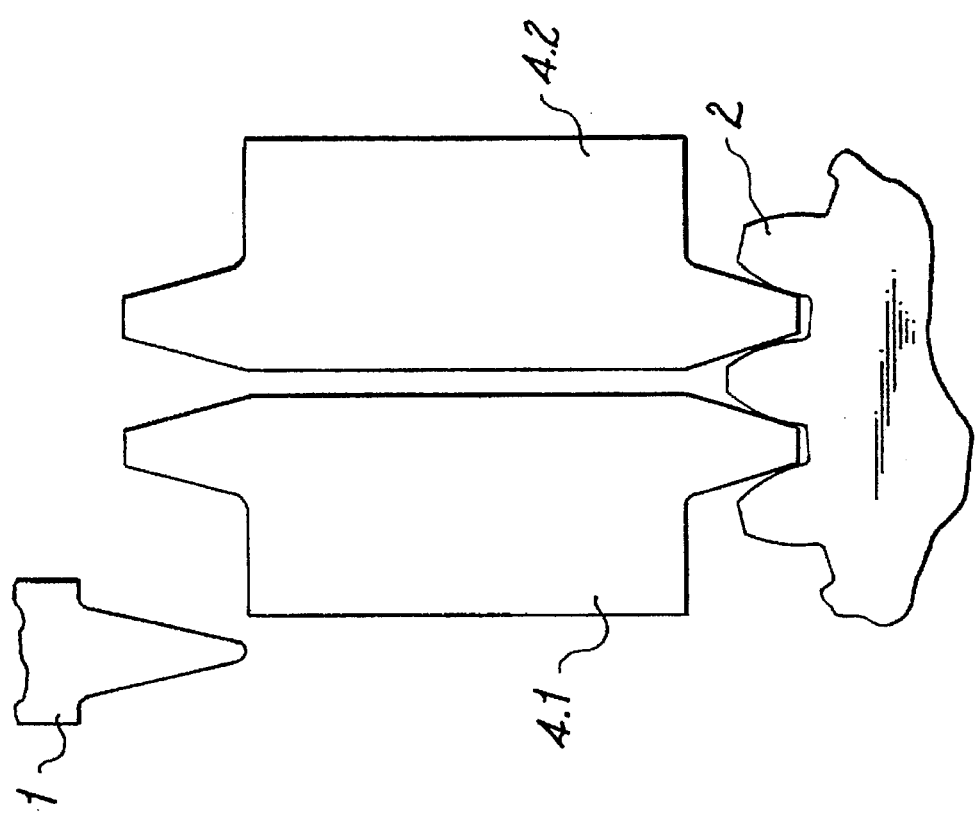

The invention is explained by examples in details below:
The drawings demonstrate:

FIG. 1 Association of the two grinding wheels to the work piece on one side, and to the dressing tool on the other side FIG. 2 Dressing positions of the grinding wheels for finish and rough grinding FIG. 3A Radial dressing infeed FIG. 3B Combined radial-tangential dressing infeed FIG. 4 Profiling cycle FIG. 5A Dressing compensation with radial dressing infeed FIG. 5B Dressing compensation with combined radial-tangential dressing infeed FIG. 6 Tool storage base of a gear profile grinding machine FIG. 7 Rotating dressing tool FIG. 8 Rotating dressing tool FIG. 9 Application of the relevant invention for the gear profile grinding to the two tooth flanks of two tooth spaces with two grinding wheels of same or different form FIG. 10 Application of the relevant invention for the index generation grinding of gears to one tooth flank each of two tooth spaces with double-tapered grinding wheels FIG. 11 Application of the relevant invention solution for the index generation grinding to two tooth flanks of two tooth spaces by two double-tapered grinding wheels The FIG. 1 shows, in its upper part, which has been swung by 90° into the drawing plane, the association of the two grinding wheels 4.1 and 4.2 to the dressing tool 1, and in its lower part, the association of the grinding wheels 4.1 and 4.2 to the work piece 2. The representation shows the mode where the two outer tooth flanks of adjacent tooth spaces are ground by the two grinding wheels 4.1 and 4.2.

The distance $\bar{e}_{n2}$ between the outer grinding surfaces of the grinding wheels 4.1 and 4.2 is identical with the tooth space chord of the virtual teeth (index 2) related to the pitch circle of the work piece 2.

The following relation exists between the virtual teeth (index 2) and the teeth of the work piece 2 (index 1):

| Specification of the work piece 2: | Normal module | $m_{n1}$ |
|---|---|---|
| | Number of teeth | $z_1$ |
| | Pressure angle | $\alpha_1$ |
| | Helix angle | $\beta_1$ |
| | Profile modification | $m_{n1} \times x_1$ |
| Specification of the virtual teeth: | Normal module | $m_{n2}$ |
| | Number of teeth | $z_2$ |
| | Pressure angle | $\alpha_2$ |
| | Helix angle | $\beta_2$ |
| | Profile modification | $m_{n2} \times x_2$ |

Conditions:  A  $\alpha_1 = \alpha_2 = \alpha$
$\beta_1 = \beta_2 = \beta$
$d_1 = d_2$ (pitch circle diameter)
$d_{b1} = d_{b2}$ (base circle diameter)
B  $m_{n1} \times x_1 = m_{n2} \times x_2$ Acc. to condition A the following relations result:

$d_1 = z_1 \times m_{n1}/\cos\beta$
$d_2 = z_2 \times m_{n2}/\cos\beta$
$d_{b1} = d_1 \times \cos\alpha = z_1 \times m_{n1} \times \cos\alpha/\cos\beta$
$d_{b2} = z_2 \times m_{n2} \times \cos\alpha/\cos\beta$
$d_{b1} = d_{b2}$
$z_1 \times m_{n1} = z_2 \times m_{n2}$ $$m_{n2} = \frac{z_1}{z_2} \times m_{n1}$$

From the statement (see also FIG. 4)
$e_{t2} = 2e_{t1} + s_{t1}$
with:

$$e_{t2} = m_{t2}\left[\frac{\pi}{2} - 2x_2 \times \tan\alpha_n\right]$$

$$e_{t1} = m_{t1}\left[\frac{\pi}{2} - 2x_1 \times \tan\alpha_n\right]$$

$$s_{t1} = m_{t1}\left[\frac{\pi}{2} - 2x_1 \times \tan\alpha_n\right]$$

($e_t$ = chordal thickness, $s_t$ = tooth thickness, $m_t$ = transverse module) this formula gives:

$$m_{t2}\left[\frac{\pi}{2} - 2x_2 \times \tan\alpha_n\right] =$$

$$m_{t1}\left([\pi - 4x_1 \times \tan\alpha_n] + \left[\frac{\pi}{2} + 2x_1 \times \tan\alpha\right]\right) =$$

$$m_{t1}\left[\frac{3\pi}{2} - 2x_2 \times \tan\alpha_n\right]$$

$m_{t2} \times \frac{\pi}{2} - 2m_{t2}x_2 \times \tan\alpha_n = 3m_{t1} \times \frac{\pi}{2} - 2m_{t1} \times x_1 \times \tan\alpha_n$ and with $\beta_1 = \beta_2 = \beta$ and $m_{t1} = m_{n1}/\cos\beta$, $m_{t2} = m_{n2}/\cos\beta$
$m_{n2} \times \pi/2 - 2m_{n2} \times x_2 \times \tan\alpha_n = 3m_{n1} \times \pi/2 - 2m_{n1} \times x_1 \times \tan\alpha_n$
With the condition B it gives:
$m_{n2} \times \pi/2 = 3m_{n1} \times \pi/2$
$m_{n2} = 3m_{n1}$ By these afore mentioned relationships the contour to be dressed of the two grinding wheels 4.1 and 4.2 can be referred to the virtual teeth (index 2) with the profile grinding of the outer tooth flanks of two adjacent teeth of a work piece 2 with the teeth (index 1). For the virtual teeth (index 2) it is valid:

$m_{n2} = 3m_{n1}$ $z_2 = z_1/3$ $d_2 = d_1$ $d_{b2} = d_{b1}$ $m_{n2} \times x_2 = m_{n1} \times x_1$ The distance of the two outer grinding surfaces of the grinding wheels 4.1 and 4.2 related to the pitch circle amounts to:

$$\bar{e}_{n2} = \frac{d \times \sin[(\psi_1 + 2\eta_1)\cos^3\beta]}{\cos^2\beta}$$

In addition to the already explained abbreviations the following characters in the equation mean:

$\psi_1$=tooth thickness half-angle $\eta_1$=tooth space width half-angle

In FIG. 2 the grinding wheels 4.1 and 4.2 are shown in the positions they occupy for dressing/finish-grinding (positions 10—upper representation, FIG. 2) and for rough-grinding (positions 11—lower representation, FIG. 2).

Shown in the upper part of FIG. 2, swung into the figure plane by 90°, is the relationship of the two grinding wheels 4.1 and 4.2 to the dressing tool, whilst below the centre line the relationship of the grinding wheels 4.1 and 4.2 to the work piece is shown. For dressing, the two grinding wheels 4.1 and 4.2 are always located in their positions 10 and their grinding surfacesces are spaced relative to the pitch circle with the distance $\bar{e}_{n2}$. For rough-grinding the grinding wheels 4.1 and 4.2 are tangentially displaced in the position 11 by the infeed amount $a_{ztR}$ and $a_{ztL}$, respectively, whereby $a_{ztR}/a_{ztL}$ correspond either to the finishing infeed amount or to the sum of the finishing infeed amount and a roughing infeed amount for a second rough-grinding revolution of the work piece.

In case an intermediate dressing is required the grinding wheels 4.1 and 4.2 return to their position 10. After dressing for finish-grinding the position 10 remains fixed for the finish-grinding.

In this way, the profile generated by the dressing tool 1 can be truly transferred to the work piece 2 without any deviations by possible positioning errors of the grinding wheels 4.1 and 4.2.

In FIG. 3A the radial dressing infeed $a_{dr}$ is shown, in FIG. 3B the combined radial ($a_{dr}$)—tangential ($a_{dt}$) dressing infeed $a_{dres}$ in the preferred direction acc. to the angle $\alpha$ (pressure angle) and $$a_{dres} = \sqrt{a_{dr}^2 + a_{dt}^2}, \quad a_{dt}/a_{dr} = \tan\alpha.$$

The tangential component of the dressing infeed $a_{dt}$ is realised through the grinding wheels 4.1 and 4.2.

It can be seen that a minimum dressing infeed $a_{d\ min}$ to generate the appropriate grinding wheel form with the combined radial-tangential dressing infeed $a_{dres}$ causes a considerably lower grinding wheel wear with dressing than with radial dressing infeed. This is particularly important with the dressing of vitrified-bond CBN-grinding wheels in order to keep the wear of the expensive CBN-abrasive low.

FIG. 4 exhibits the elements P1 to P9 of the profiling cycle of the dressing of the two grinding wheels 4.1 and 4.2, wherein the rotating dressing tool 1 is traversed by CNC-control either from the stand-by position W1 to the stand-by position W2, or vice-versa.

The elements of the profiling cycle are:

P1 Movement of the dressing tool 1 from the stand-by position W1 to the grinding wheel 4.1 (straight line)

P2 Profiling the grinding wheel 4.1 which is generally of cylindrical shape (straight line)

P3 Profiling that section of the grinding wheel contour 4.1 for grinding the tip area of the gear-like work piece (arc or straight line)

P4 Profiling that section of the grinding wheel contour 4.1 for grinding the flank area of the gear-like work piece (involute or modified involute or arc or straight line)

P5 Profiling that section of the grinding wheel contour 4.1 for grinding the root area of the gear-like work piece (arc or specific curve)

P6 Profiling the periphery of the grinding wheel 4.1 (straight line of a cone or cylinder)

P7 Profiling the transition from the outer contour to the non-active flank area of the grinding wheel 4.1 (arc or straight line or specific curve)

P8 Profiling the non-active flank area—generally a contour located within the reference profile 5 (reference rack), in particular the specific contour of the non-active flank of the grinding wheel 4.1. (straight line or arc or involute or modified involute)

P9 Profiling the root area of the non-active flank of the grinding wheel 4.1 (arc or straight line or specific curve)

P10 Profiling the space between grinding wheel 4.1 and 4.2 (arc or straight line)

P11 Profiling the root area of the non-active flank of the grinding wheel 4.2 (arc or straight line or specific curve)

P12 Profiling the non-active flank area—generally a contour located within the reference profile 5 (reference rack), in particular the specific contour of the non-active flank of the grinding wheel 4.2. (straight line or arc or involute or modified involute)

P13 Profiling the transition from the outer contour to the non-active flank area of the grinding wheel 4.2 (arc or straight line or specific curve)

P14 Profiling the periphery of the grinding heel 4.2 (straight line of a cone or cylinder)

P15 Profiling that section of the grinding wheel contour 4.2 for grinding the root area of the gear-like work piece (arc or specific curve)

P16 Profiling that section of the grinding wheel contour 4.2 for grinding the flank area of the gear-like work piece (involute or modified involute or arc or straight line)

P17 Profiling that section of the grinding wheel contour 4.2 for grinding the tip area of the gear-like work piece (arc or straight line)

P18 Profiling the grinding wheel body 4.2 which is generally of cylindrical shape (straight line)

P19 Moving the dressing tool 1 to the stand-by position W2 (straight line)

Acc. to the actual machining task the single elements of the profiling cycle (straight line, arc. etc.) may be performed or omitted, as required.

In FIG. 5A the dressing compensation $l_{anr}$ of the grinding wheel 4.2 with radial dressing in feed $a_{dr}$, whilst in FIG. 5B the dressing compensation $$l_{an\ res} = \sqrt{l_{anr}^2 + l_{ant}^2}$$

with combined radial-tangential dressing infeed $a_{dres}$ are demonstrated.

The dressing compensation $l_{an\ res}$ is effected, as the dressing infeed $a_{dres}$, in the direction acc. to the angle $\alpha$ (pressure angle) with:

$$\frac{l_{cnt}}{l_{cnr}} = \frac{a_{dt}}{a_{dr}} = \tan\alpha$$

The tangential dressing compensation amount $l_{an\ t}$ has already been incorporated by the grinding wheels 4.1 and 4.2 when traversing the tangential dressing infeed $a_{dr}$. Hereby the reason for a grinding wheel contour in the non-active flank area becomes clear, it has been adapted to the contour of the reference profile 5 (reference rack).

FIG. 6 demonstrates the tool storage base of a gear profile grinding machine to perform the relevant invention.

The swivel base 13 supports the two grinding slides 14.1 and 14.2 whose grinding spindles (not shown) carry the two grinding wheels 4.1 and 4.2. The grinding wheels 4.1 and 4.2 revolve around the common axis of rotation 15. The grinding slides 14.1 and 14.2 are CNC-controlled and adjustable to each other along the axis of rotation 15.

The swivel base 13 supports the dresser 16 as well as being equipped with a rotating dressing tool 1 whose axis of rotation 6 is located in parallel to the axis of rotation 15 of the grinding wheels 4.1 and 4.2.

The rotating dressing tool 1 can be traversed along the contour of the grinding wheels 4.1 and 4.2 by a continuous path CNC-control in two CNC-axes operating vertically and parallel to the axis of rotation of the dresser 16.

The mode of operation of the mechanism is explained in the description of the method.

FIG. 7 shows the axial section of the rotating dressing tool 1 for the profiling of one or two grinding wheels, 4.1 and 4.2 for the grinding of tooth flanks in adjacent tooth spaces of a work piece 2 whose axis is situated parallel to the joint axis of rotation 15 of the grinding wheels 4.1 and 4.2.

The metal body is divided into a cylindrical hub base 8 and profiled section 9 featuring the following characteristics for the axial section:

| | |
|---|---|
| Profile height | $H > 2.5 \times m_{nl}$ |
| Profile width | $B \leq 0.6 \times m_{nl}$ |
| Profile radius | $R \leq 0.3 \times m_{nl}$ |
| Thickness of the abrasive layer | $S \geq 1.5 \times R$ |
| Profile angle | $v = (5 \ldots 15)°$ |
| preferred | $v = 10°$ |

FIG. 8 exhibits another advantage, the very stiff design of the rotating dressing tool 1 featuring a similar structure to the metal hub base and preferable for the grinding of small modules. Herein the characteristics for the axial section of the profile area 9 are:

| | |
|---|---|
| Profile width | $B \leq 0.6 \times m_{nl}$ |
| Profile radius | $R \leq 0.3 \times m_{nl}$ |
| Thickness of the abrasive layer | $S \geq 1.5 \times R$ |

The contour of the axial section is limited by an angle $2v$. to be valid:

| | |
|---|---|
| Profile angle | $v = (5 \ldots 15)°$ |
| preferred | $v = 10°$ |

The rotating dressing tools 1 acc. to the two designs are lined with diamond abrasive 3. Rotating dressing tools 1 designed in this way are capable of all possible profiling tasks by help of the continuous path two-axis CNC-control.

FIG. 9 demonstrates the application of the relevant invention for the gear profile grinding of both tooth flanks of two teeth of a work piece (gear wheel) by means of two grinding wheels 4.1 and 4.2. For this purpose, both grinding wheels 4.1 and 4.2 of the same specification with identical dressing and grinding wheels 4.1 and 4.2 of the same specification but dressed differently, for example, for rough and finishing grinding, and grinding wheels 4.1 and 4.2 of differing specification with same or different dressing conditions can also be used.

It is, however, also possible to use the grinding wheels 4.1 and 4.2 which have been dressed by the relevant invention method one after the other as roughing and finishing wheels, particularly when vitrified-bond CBN-grinding wheels are utilised.

FIG. 10 shows the application of the relevant invention for the index generation grinding of gears, i.e., of one tooth flank each of two teeth of the work piece 2 by two double-tapered grinding wheels 4.1 and 4.2.

FIG. 11 shows an application for the index generation grinding of gears, i.e., of the two tooth flanks of two teeth of the work piece 2 by two double-tapered grinding wheels 4.1 and 4.2.

In this, both grinding wheels 4.1 and 4.2 are of the same specification with identical dressing and grinding wheels 4.1 and 4.2 of the same specification but dressed differently, for example, for rough and finish grinding, as well as grinding wheels 4.1 and 4.2 of different specifications with identical or different dressing can be used.

Moreover, it is possible applying the relevant invention for the grinding with more than one profile per grinding wheel 4.1 and 4.2 by the repetition of elements of the profiling cycle, i.e. the profile grinding of racks featuring small modules by multi-profile grinding wheels.

In addition it is possible using the relevant invention for the profiling of grinding worms:

- either by attaching a rotating, profiled dressing tool to the dresser 16 (comparable with the known mechanisms in gear grinders working in the continuous grinding mode)
- or with a rotating form dressing tool with incremental position displacement of the form dressing tool after each thread generating movement.

For either version a constraining movement is additionally required between the CNC-axis of the dresser 16 being parallel with the axis of rotation of the grinding wheel 15 and the grinding wheel rotation.

What is claimed is:

1. Method for grinding a groove shaped external profile of a work piece, in which profile sections of one work piece are simultaneously machined by two grinding wheels which are profiled according to the groove-shaped external profile of the work piece and metal is removed by opposite feed movement and joint stroking travel of the two grinding wheels, said method comprising the following steps:

a) a control unit calculates an axial distance between the two grinding wheels according to a distance of the groove-shaped external profile of the work piece and consequently, determines finish-grinding positions of the two grinding wheels, (b) then the two grinding wheels are removed into these finish-grinding positions and remain positioned there, (c) then a dressing tool is moved along the two grinding wheels by controlling a continuous path according to an existing computer program and work profile, and said dressing tool profiles the two grinding wheels, one after the other, and generates a surface roughness, suitable for rough-grinding the workpiece, on the two grinding wheels, (d) after this dressing procedure for rough-grinding, the two grinding wheels are moved into the rough-grinding positions which have been calculated by the control unit under consideration of the grinding stock, and they remain positioned there, (e) then the work piece is rough-ground, (f) after termination of the rough-grinding the two grinding wheels are moved into the finish-grinding positions, which also are used as dressing positions, and remain positioned there, (g) then the two grinding wheels are re-profiled one after the other by the dressing tool, in a finish-dressing procedure analogous to the dressing procedure for rough-grinding, to generate a surface suitable for finish-grinding on the two grinding wheels, (h) after this finish-dressing procedure for finish-grinding, the two grinding wheels remain in their positions and finish-grinding of the work piece takes place in those positions.

2. Method according to claim 1, characterized by: that the dressing procedure for the grinding wheels for the grinding of gear wheels runs according to the following steps of the method:

(i) the position of the two grinding wheels being adjustable tangentially in the plane normal to the work piece and symmetrical to the profile centre line such that the distance related to the pitch cylinder between the outer grinding surfaces of the two grinding wheels amount to $$\bar{e}_{n2} = \frac{d \times \sin[(\Psi_1 + \eta_1)\cos^3\beta]}{\cos^2\beta}$$

in the equation the symbols are:

$\bar{e}_{n2}$ = Chordal of space width of virtual teeth (index 2) where $m_{n2} = 3\ m_{n1}$ $m_{n1}$ = Normal module of the teeth $m_{n2}$ = Normal module of the "virtual teeth"

$d$ = Pitch circle diameter $\psi_1$ = Tooth thickness half – angle $\eta_1$ = Tooth space half-angle $\beta$ = Helix angle where $\psi_1$, $\eta_1$ and $\beta$ are related to the pitch circle;

(j) dressing infeed movement
radially to the two grinding wheels by the amount $a_{dr}$ for vitrified-bond corundum grinding wheels, or combined radially ($a_{dr}$) and tangentially ($a_{dt}$) with the ratio $$\frac{a_{dt}}{a_{dr}} = \tan\alpha$$

for vitrified-bond CBN-grinding wheels to reduce grinding wheel wear, where "$\alpha$" is ($a_{dt}$) is passed by the grinding wheels each;

(k) moving the dressing tool from a defined stand-by position W1 (W2) to the other stand-by position W2 (W1) and the calculated profile is sequentially generated on the two grinding wheels (4.1 and 4.2) in a closed dressing cycle;

(l) dressing compensation performed by:
re-adjusting the two grinding wheels (4.1 and 4.2) radially by the amount $l_{anr} = a_{dr}$ relative to the work piece, or re-adjusting radially by the amount $l_{anr}$ and tangentially by the amount $l_{ant}$ combined such that:

$$\text{ratio}\ \frac{l_{ant}}{l_{anr}} = \tan\alpha$$

with combined radial and tangential dressing where $$\tan\alpha = \frac{a_{dt}}{a_{dr}} = \tan\alpha,$$

whereby the tangential dressing compensation amount ($l_{ant}$) was already allowed for with the tangential dressing infeed component.

3. Mechanism for grinding a work piece, according to claim 1, said mechanism comprising:

two grinding slides carrying one driving unit and grinding spindle each as well as a dresser, characterized by:
that the grinding slides are arranged in such a way that the two grinding wheels have a common axis of rotation along which each grinding slide is adjustable axially by CNC-control and a single rotating dressing tool whose axis of rotation is located parallel to the axis of the grinding wheels, and a dresser to be traversed in two co-ordinates controlled by the CNC-unit;

the two grinding wheels are means for simultaneously machining profile sections the work piece by opposite feed movement and joint stroking travel of the two grinding wheels;

said CNC control comprising computer program means and work profile means and control unit means:
for calculating an axial distance between the two grinding wheels according to a distance of the groove-shaped external profile of the work piece and consequently, for determining finish-grinding positions of the two grinding wheels, for removing the two grinding wheels into these finish-grinding positions and keeping said wheels positioned there, for moving the dressing tool along the two grinding wheels by continuous path control, for profiling the two grinding wheels one after the other, for generating a surface roughness suitable for roughing on the two grinding wheels, for moving the two grinding wheels into rough-grinding positions which have been calculated by the control unit under consideration of the grinding stock, and for rough-grinding the work piece, for, after terminating the rough-grinding, moving the two grinding wheels into the finish-grinding positions, which also are used as dressing positions, and for keeping the wheels there, for re-profiling the two grinding wheels one after the other by the dressing tool in a finish-dressing procedure, analogous to the dressing procedure for rough-grinding, said finish dressing procedure for generating a surface means for finish-grinding on the two grinding wheels, and for, after this finish dressing procedure, holding the two grinding wheels in their positions and finish-grinding the work piece.

4. Mechanism according to claim 3 characterized by:
that the rotating dressing tool comprises a metal body coated with diamond abrasive, in which the body has the following characteristics:

| | |
|---|---|
| Profile height | $H > 2.5 \times m_{n1}$ |
| Profile width | $B \leq 0.6 \times m_{n1}$ |
| Profile radius | $R \leq 0.3 \times m_{n1}$ |
| Thickness of abrasive lining | $S \leq 1.5 \times R$ |
| Profile angle | $v = (5 \ldots 15)°$. |

5. Mechanism according to claim 3, characterised by:
that the rotating dressing tool comprises a metal body coated with diamond abrasive;
the body is divided into a hub part and profile part, and the profile part features the following characteristics:

| | |
|---|---|
| Profile width | $B \leq 0.6 \times m_{n1}$ |
| Profile radius | $R \leq 0.3 \times m_{n1}$ |
| Thickness of abrasive coating | $S \geq 1.5 \times R$ | and the cone about its axis is confined by an angle $2 \times v$ where:

| | |
|---|---|
| Profile angle | $v = (5 \ldots 15)°$. |

6. A method according to claim 1 in which the method is for grinding teeth of straight and helical gears.

7. A mechanism according to claim 4 in which the Profile angle $v=10°$.

8. A mechanism according to claim 5, in which Profile angle $v=10°$.

* * * * *